J. B. KRONK & A. P. GOLD.
CIGAR BOX.
APPLICATION FILED DEC. 17, 1907.
906,899.
Patented Dec. 15, 1908.
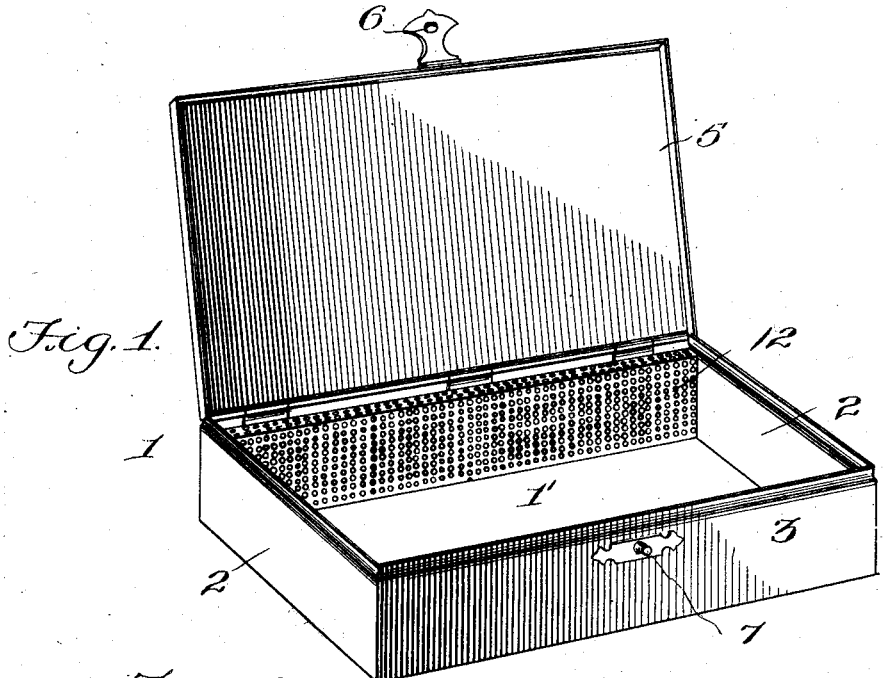
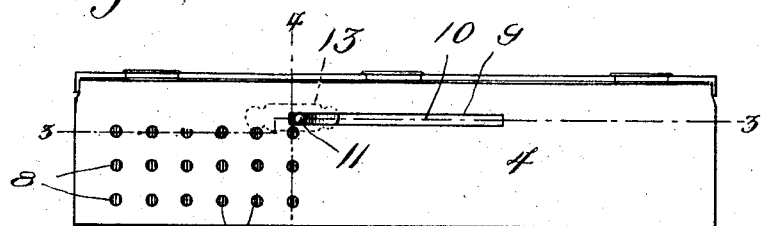
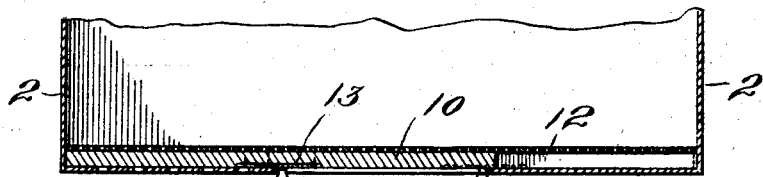
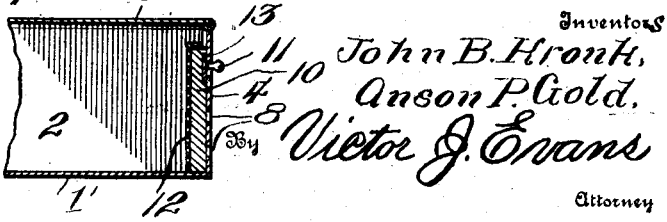

UNITED STATES PATENT OFFICE.

JOHN B. KRONK AND ANSON P. GOLD, OF ANDERSON, INDIANA.

CIGAR-BOX.

No. 906,899.   Specification of Letters Patent.   Patented Dec. 15, 1908.

Application filed December 17, 1907. Serial No. 406,909.

*To all whom it may concern:*

Be it known that we, JOHN B. KRONK and ANSON P. GOLD, citizens of the United States, residing at Anderson, in the county of Madison and State of Indiana, have invented new and useful Improvements in Cigar-Boxes, of which the following is a specification.

This invention relates to metallic cigar boxes, and the object of the invention is to provide a metal box adapted for the reception of cigars provided with perforations regulated by a slide whereby ventilation and moisture may be imparted to the cigars within the box.

Another object of the invention is to provide a metallic cigar box with a series of ventilating and moisture admitting openings regulated by a slide composed of cedar or other aromatic wood, which may be perforated if preferred, whereby the flavor of the wood is imparted to the cigars within the box.

With these and other objects in view the invention resides in the novel construction of boxes hereinafter fully described and claimed.

In the drawings, Figure 1 is a perspective view of a box adapted for the reception of cigars, constructed in accordance with our invention. Fig. 2 is a rear elevation of the same. Fig. 3 is a partial horizontal section upon the line 3—3 of Fig. 2. Fig. 4 is a partial vertical section upon the line 4—4 of Fig. 2.

The cigar boxes now in general use are composed entirely of wood, and the wood most used in the construction of these boxes is of cedar whereby an aroma of the wood is imparted to the cigars within the box and impregnates them with a distinctly cedar flavor which is much enjoyed by cigar smokers. Metallic boxes adapted for cigars have been constructed but have not been adapted for this purpose for the reason that the aroma of the cedar wood is not imparted by the boxes and as a consequence the cigars have not been in demand. Again metallic boxes have been interlined with cedar wood in order to impart the flavor of cedar to the cigars within the box but this also has met with failure for the reason that sufficient ventilation has not been given the wood within the box whereby the aroma of the wood might be imparted to the cigars.

In carrying out our invention we have constructed a metallic box having a hinged cover and clasping therefor and being provided upon one of its longitudinal sides with a perforated jacket inclosing a slide composed of cedar wood and adapted to regulate a series of ventilating and moisture admitting openings within the side of the box to which the jacket is attached. By this construction a sufficient amount of air and moisture is admitted to the cigars within the box and the air and moisture penetrating the cedar slide a distinct aroma of cedar wood is imparted to the cigars.

In the accompanying drawings the numeral 1 designates a metallic cigar box constructed in accordance with our invention. The box comprises the bottom 1′, sides 2, front 3, back 4 and cover 5, hingedly secured to the back 4 of the box. The cover 5 is provided with a suitable clasp 6 adapted for engagement with the retaining element 7 upon the front 3 of the box. The back 4 of the box is provided with a series of perforations 8 near one of its ends, and with a longitudinal slot 9 arranged slightly above the uppermost series of the perforations 8 and extending in a direction away from the perforations and towards the opposite end of the back 4. A suitable slide 10 constructed preferably of cedar wood is employed upon the back 4 of the box, and the slide is provided with a suitable pintle 11 adapted for engagement within the slot 9 of the back 4. A perforated jacket 12 is provided between the sides 2 of the box at a distance from the back 4 approximately equaling the thickness of the slide 10, and the slide is held normally in contact with the vertical wall of this jacket 12 by a leaf spring 13 secured upon the opposite side of the slide 10, and to which the pintle or finger hold is secured.

By the construction of cigar boxes just described it will be seen that we have provided a metallic cigar box whereby the cigars within the box may receive any desired quantity of ventilation and moisture and whereby a distinct aroma of cedar or other aromatic wood is imparted to the cigars.

Having thus fully described the invention what is claimed as new is:

1. A metallic cigar box having one of its ends provided with a series of perforations, a perforated jacket adjacent this end, a slide composed of cedar wood between the jacket and the perforations.

2. A metallic cigar box having one of its ends provided with a series of perforations, a perforated jacket adjacent this end, a slide composed of cedar wood between the jacket and the perforated end a spring upon the slide adapted to force it against the perforated jacket, a pintle upon the slide, and the end of the box being provided with a longitudinal slot adapted to receive the pintle of the slide and to limit the movement of the slide in two directions.

In testimony whereof we affix our signatures in presence of two witnesses.

JOHN B. KRONK.
ANSON P. GOLD

Witnesses:
JULIA A. MOORE,
D. C. CHIPMAN.